Jan. 22, 1957  B. R. TOMEK ET AL  2,778,668
BATTERY CARRIER
Filed June 3, 1954
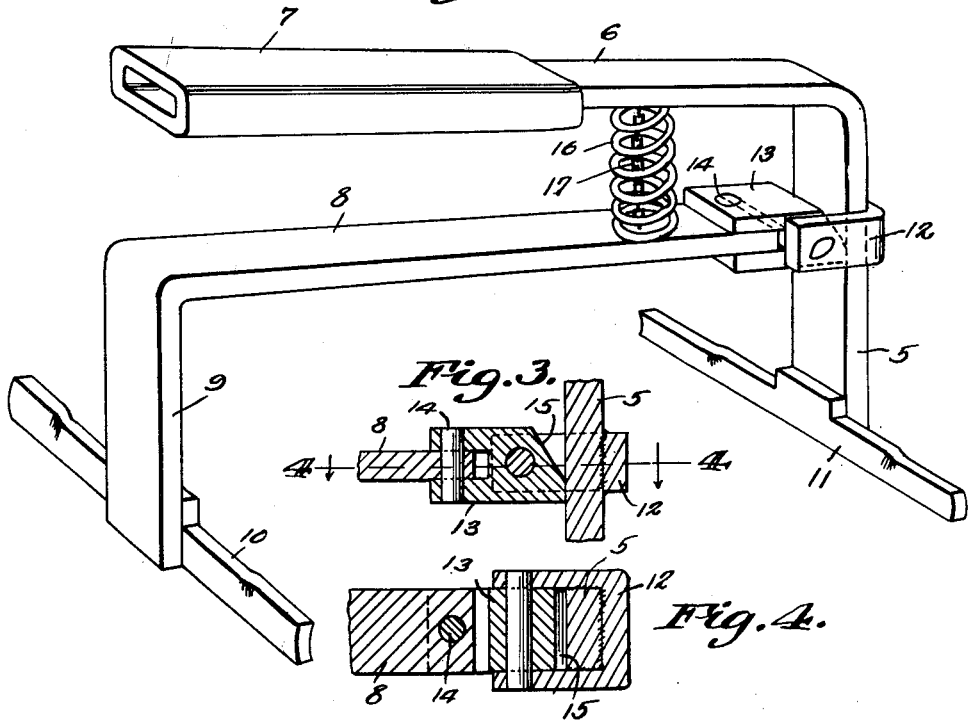
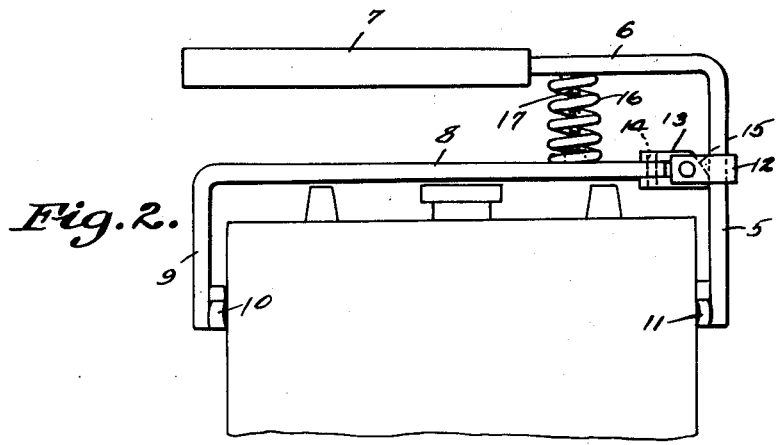
B. R. Tomek
O. S. Mykleby
INVENTORS.
BY C.A. Snow & Co.
ATTORNEYS.

United States Patent Office 2,778,668
Patented Jan. 22, 1957

2,778,668

BATTERY CARRIER

Bernard R. Tomek and Olaf S. Mykleby,
Aberdeen, S. Dak.

Application June 3, 1954, Serial No. 434,134

3 Claims. (Cl. 294—16)

This invention relates to battery carriers, the primary object of this invention being to provide a battery carrier which may be readily positioned over a battery for carrying purposes, the carrier automatically positioning itself in gripping relation with the battery when the carrier is lifted to the carrying position.

An important object of the invention is to provide a carrier of this kind including a pair of supporting arms with gripping jaws at their free ends, said arms being connected in such a way that when the device is not in use as a carrier, the arms will be held in positions for ready application to a battery, by restricting pivotal movement of said arms with respect to each other.

Still another object of the invention is to provide means for connecting the carrier arms, to cause the arms to adjust themselves to the particular shape of the battery being lifted for a more effective gripping and handling of the battery with the carrier.

Other and further objects and advantages of the invention will be hereinafter described and the novel features thereof defined in the appended claims.

In the drawings:

Fig. 1 is a perspective view of a battery carrier, constructed in accordance with the invention.

Fig. 2 is an end elevational view of the carrier illustrating the carrier as positioned over a battery for carrying purposes.

Fig. 3 is a sectional view illustrating the detailed construction of the pivotal connection between the horizontal arm and vertical arm of the carrier.

Fig. 4 is a sectional view taken on the line 4—4 of Fig. 3.

Referring to the drawing in detail, the battery carrier comprises a main pressure arm indicated by the reference character 5 which is formed with a right angled end portion 6 providing a handle over which the hand grip 7 is positioned, the hand grip 7 being constructed of suitable cushioning material, such as rubber or the like.

The reference character 8 indicates the main bar of the carrier, which is formed with a right angled end portion 9 extending downwardly therefrom, the right angled end portion 9 supporting the jaw 10 at its lower end, the jaw 10 providing a bar which extends transversely of the right angled portion 9 and terminates appreciable distances beyond the side edges of the right angled end portion 9, as clearly shown by the drawing.

The main pressure arm 5 provides a support for the jaw 11 which is secured to the inner surface thereof, and is of a length to extend a substantial distance beyond the side edges of the main pressure arm 5.

The main bar 8 is connected to the pressure arm 5, by means of the yoke 12 which is secured to said pressure arm by welding, the open side of the yoke extending inwardly from the pressure arm.

Pivotally mounted between the ends of the yoke 12, is a pivot block 13 which is formed with a groove in the forward edge thereof, into which one end of the main bar 8 extends, where the main bar is secured to the pivot block 13, by means of the pivot pin 14.

As clearly shown by Fig. 3 of the drawing, the inner upper edge of the pivot block 13 is beveled at 15 providing a clearance so that the block together with the main bar 8, may swing upwardly, but restricted in its downward movement by contact with the lower edge of the block 13 with the inner surface of the pressure arm 5. Due to this construction, it will be seen that when the carrier is in its normal position and not positioned over a battery, the main bar 8 will be held in a substantially horizontal position, thus restricting the downward movement of the main bar.

The main bar and right angled end portion 6 of the main pressure arm 5, are normally biased apart, by means of the coiled spring 16 which has one of its ends bearing against the right angled end portion 6, while the opposite end of the spring rests on the upper surface of the main bar 8, as better shown by Fig. 1 of the drawing. In order that movement of the main right angled end portion 6 of the main pressure arm 5 and main bar 8 will be restricted, away from each other, a chain 17 is connected with the right angled end portions 6 and main bar 8, the chain providing a stop to limit movement of the members 6 and 8 with respect to each other.

In the use of the carrier, it is only necessary to place the carrier over a battery, forcing the carrier downwardly so that the jaws 10 and 11 move into contact with the ends of the battery. As the handle 6 is pulled upwardly in lifting the carrier and battery, the jaws 10 and 11 are moved into gripping relation with the ends of the battery so that the carrier will be securely held in place on the battery and the battery may be carried to the desired location.

When the right angled end portion 6 and main bar 8 are moved towards each other as by gripping the members 6 and 8, the spring will be tensioned, and the jaws 10 and 11 will be moved laterally away from the ends of the battery releasing the battery.

From the foregoing it will be seen that due to the construction shown and described, I have provided a battery carrier which may be readily and easily positioned over a battery, with the jaws of the carrier moved into contact with the ends of the battery, the contact between the jaws and the battery being increased by the weight of the battery as lifted. The battery shown in Fig. 2 is a battery of minimum length and it will be understood that where a slightly longer size battery is to be lifted, the arm 5 may swing outwardly so as to be disposed at an obtuse angle with respect to the main bar 8. The battery herein shown is only diagrammatic and it will be understood that many types of batteries have inset side and end walls which form a shoulder about the upper part of the battery, and in such cases the jaws 10 and 11 will engage below the shoulder. Where the battery has straight sides and ends the carrier herein disclosed will operate with the size of battery slightly larger than disclosed.

While the specific details of one embodiment of this invention have been herein shown and described, the invention is not confined thereto as changes and alterations may be made without departing from the spirit and scope thereof as defined in the appended claims.

What is claimed is:

1. A battery carrier of the class described, comprising a vertical pressure arm having a right angled horizontal portion providing a handle, a horizontal yoke secured to said pressure arm, said yoke having spaced ends extending a substantial distance beyond the inner surface of said pressure arm, a main arm including a right angled depending portion, disposed under said handle in vertical alignment therewith, a pivot block mounted for vertical pivotal movement between the ends of said yoke, to which said main arm is secured, an expansion spring disposed between said handle and said main arm, normally biasing said pressure arm and main arm apart, a chain extending through said spring, connected between said pressure arm and main arm restricting movement of said arms away from each other, and jaws on said pressure arm and main arm for clamping a battery when said depending portion and pressure arm are in substantially vertical position.

2. A battery carrier of the class described, comprising a vertical pressure arm having a right-angled horizontal portion providing a handle, a horizontal yoke secured to said pressure arm, said yoke having spaced ends extending inwardly a substantial distance beyond the inner surface of said pressure arm, a main arm including a right angled depending portion disposed under said handle in vertical alignment therewith, a pivot block having a groove into which one end of said main arm extends, a horizontal pivot extending through said yoke and said block, a coiled spring disposed between said handle and main arm normally urging the handle and main arm apart, means for restricting movement of said handle and main arm with respect to each other and away from each other, and jaws carried by said main arm and pressure bar for clamping a battery therebetween when said pressure arm and said depending portion are in substantially vertical position.

3. A carrier of the class described, comprising a vertical pressure arm, a horizontal handle forming a part of said pressure arm and extending laterally thereof, a horizontal yoke secured to said pressure arm, the free ends of said yoke extending inwardly beyond the inner surface of said pressure arm, a horizontal main arm having a vertical depending portion, a pivot block to which said main arm is connected, means for pivotally connecting the pivot block between the ends of said yoke for vertical pivotal movement, the upper inner edge of said pivot block being beveled providing a clearance between said block and pressure arm, means for normally urging the handle and main arm away from each other, and jaws secured to said pressure arm and said depending portion for gripping a battery over which said carrier is positioned when said pressure arm and depending portion are in substantially vertical position.

References Cited in the file of this patent

UNITED STATES PATENTS 1,488,455  Chase _____ Mar. 25, 1924